Patented Sept. 21, 1954

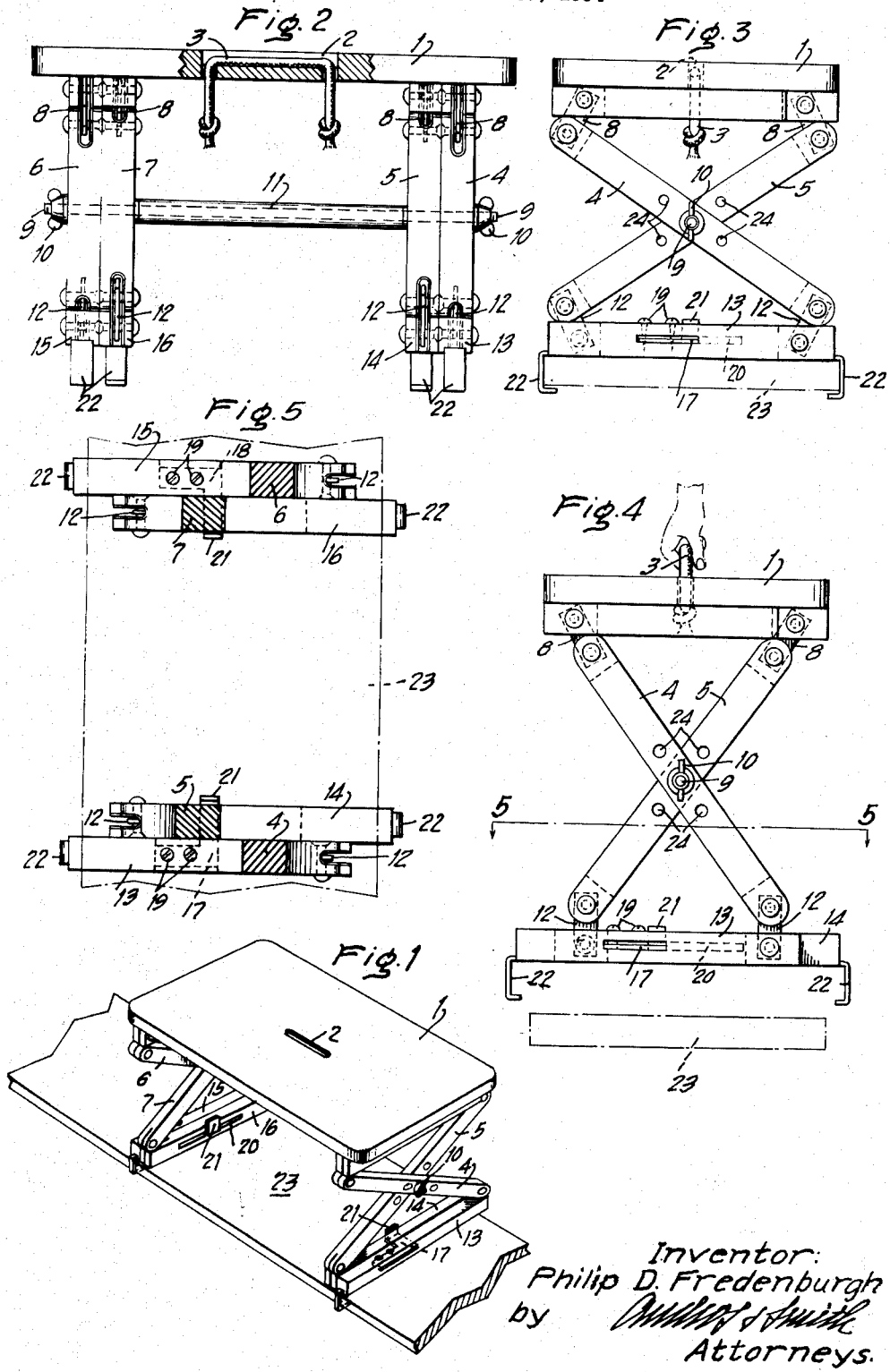

2,689,601

UNITED STATES PATENT OFFICE 2,689,601

PORTABLE SEAT

Philip D. Fredenburgh, Albany, N. Y.

Application March 19, 1954, Serial No. 417,305

10 Claims. (Cl. 155—133)

My invention relates to portable seats and particularly to a seat which is adapted for attachment to the fixed seat of a rowboat or the like.

Most seats in rowboats are comparatively low and the principal object of my invention is to provide a seat which may be readily attached to and detached from a fixed seat of a rowboat or the like which will provide a substantially higher seat for a fisherman or other occupant of the boat. Another object of my invention is to provide a seat of this general character which is inexpensive, easily carried from place to place, and which may be adjusted for attachment to boat seats or the like, of various widths.

I accomplish these objects by the means described below and illustrated in the accompanying drawing in which—

Fig. 1 is a perspective view of my portable seat attached to a boat seat or the like;

Fig. 2 is a front elevation of my seat with a portion broken away and in section;

Fig. 3 is a side view thereof;

Fig. 4 is a side view similar to Fig. 3 but showing the device as it is about to be positioned on a boat seat or just removed therefrom; and Fig. 5 is a section of Fig. 4 in the plane 5—5.

Referring to the drawings—

My seat comprises a platform 1, having a slotted recess 2 in the center thereof in which a carrying handle 3 is normally positioned but which may be pulled up, as shown in Fig. 4, to be gripped by the hand. As shown, the handle is of rope but it may be of metal or any other suitable material.

Pivotally connected to the platform adjacent each end thereof, by means of links 8, is a pair of crossed legs 4 and 5, and 6 and 7. The legs 4 and 5, and 6 and 7, are pivotally connected where they cross, by means of the threaded bar 9 having a wing nut 10 at least at one end thereof. The bar 9 passes through a tubular element 11, the ends of which bear against the inner legs 5 and 7 and serve to maintain the legs in properly spaced relation. The legs, 4, 5, 6 and 7, have pivotally connected to the lower ends thereof, by means of links 12, similar to the links 8, members 13, 14, 15 and 16, respectively, which are disposed substantially parallel to the platform 1 and slidably secured together in this position by means of the angle members 17 and 18. One leg of the angle member 17 is secured to the member 13 by means of the screws 19. A portion of this leg extends through a slot 20 in the member 14 and has an upturned portion 21 which runs in contact with the inner side of the member 14. Thus, the members 13 and 14 are held in side-by-side relation but may slide lengthwise or in a direction transversely of the platform 1. The members 15 and 16 are held in side-by-side slidable relation by the similar angle 18. Each of the members 13, 14, 15 and 16 is provided at its end with a depending channel 22 adapted to engage the edge of a boat seat or the like, as best shown in Fig. 1.

From the foregoing and Fig. 4, it will be apparent that when the seat is suspended from the handle, the ends of the crossed legs tend to move towards each other while the free ends of the members 13, 14, 15 and 16 move away from each other. But, as the seat is lowered until the members 13, 14, 15 and 16 rest upon the boat seat 23, a further lowering of the seat to the position shown in Fig. 3, will cause the free ends of the members and the channels 22 thereon to approach each other until they engage the opposite edges of the seat, as shown in Figs. 1 and 3.

Because boat seats vary in width, it is desirable to provide some means for adjusting my seat so that it may be used with boat seats of various widths. To accomplish this, holes, such as shown at 24 in Figs. 3 and 4, are provided in the legs. Thus, the bar or rod 9 may extend through the four upper holes in the legs, the center holes, as shown, or the four lower holes.

From the foregoing, it will be apparent that I have provided a readily portable seat which may be attached to a boat seat by merely lowering it until the bottom members rest thereon and the channels at the free ends of said members move into engagement with the opposite edges of the boat seat. In order to remove my seat from the boat seat, it is only necessary to raise it by means of the handle 2, as shown in Fig. 4; whereupon, the channels at the free ends of the bottom members will move away from each other and out of engagement with the boat seat.

While I have described my invention in its preferred embodiment, it is to be understood that the words which I have used are words of description rather than of limitation and that changes within the purview of the appended claims, may be made without departing from the true scope and spirit of my invention in its broader aspects.

What I claim is:

1. A portable seat adapted for attachment to a fixed seat in a rowboat or the like; said portable seat comprising a platform; a pair of depending crossed legs pivotally connected to said platform adjacent each end thereof; means pivotally connecting together each pair of said depending legs in the zone of their crossing; a separate member pivotally connected to each of said crossed legs at the lower end thereof; means slidably connecting together those members which are connected to each pair of said depending crossed legs in approximately parallel disposed relation to said platform to move in directions transversely of said platform; and depending means secured to each of said slidably connected members at the free end thereof adapted to engage an edge of a fixed seat in said boat.

2. A portable seat adapted to be supported upon and readily attachable to and detachable from a fixed seat in a rowboat or the like; said portable seat comprising a platform; a pair of crossed legs depending from said platform adjacent each end thereof; means pivotally connecting each of said legs to said platform; common means pivotally connecting said pairs of legs in their zones of crossing, including means for clamping the legs of each pair together against movement about the axis of their common, pivotal, connecting means; a pair of members adapted to rest on top of said boat seat pivotally connected to each leg of each of said pairs of legs at the lower ends thereof; said members being provided adjacent the free ends thereof with depending means adapted to engage the edge of said boat seat; and means slidably connecting the members of each pair in side-by-side relation to move in directions transversely of said platform.

3. In a portable seat adapted to be supported upon a fixed seat in a rowboat or the like and to be readily attached thereto and detached therefrom; the combination with a platform; of a pair of supporting legs therefor pivotally connected to and depending from said platform adjacent each end thereof; of seat-engaging means pivotally connected to said legs at the bottoms thereof; and means slidably connecting said seat-engaging means to move automatically in a direction towards and into engagement with the opposite edges of said boat seat when said portable seat is placed on said boat seat, and in a direction away from and out of engagement with the edges of said boat seat when said portable seat is lifted therefrom.

4. The structure set forth in claim 3 together with means for clamping said boat seat-engaging means in engagement with the opposite edges of said boat seat.

5. A portable seat adapted to be supported on a fixed seat in a rowboat or the like and to be readily attached thereto and detached therefrom; said portable seat comprising the combination with a platform; of legs depending therefrom for supporting said portable seat on said boat seat in vertically spaced relation thereto; members adapted to lie on said boat seat when said portable seat is supported thereon and provided with means for engaging the opposite edges of said boat seat; means pivotally connecting said legs to said platform; means pivotally connecting said legs together in a zone intermediate the ends thereof; means pivotally connecting said members to said legs; and means slidably connecting said members together substantially parallel to said platform to move said boat seat-engaging means thereon into engagement with the edges of said boat seat when said members are rested thereon and said platform is lowered, and out of engagement with said edges when said platform is raised.

6. The structure set forth in claim 5 in which the means pivotally connecting said legs to said platform, and the means pivotally connecting said members to said legs include links.

7. The structure set forth in claim 5 in which the means pivotally connecting said legs together includes manually operable means for clamping said legs together against relative movement.

8. The structure set forth in claim 5 in which said legs are provided with holes spaced longitudinally thereof for the passage of the means pivotally connecting them together; whereby to adjust the spacing of said boat seat-engaging means to fit boat seats of different width.

9. The structure set forth in claim 5 in which said platform is provided with a carrying handle normally recessed therein when said portable seat is attached to a boat seat.

10. In a portable seat, adapted for attachment to a seat in a rowboat or the like, the combination with a platform; of means adapted to rest on said boat seat and engage the opposite edges thereof; and means for supporting said platform in vertically spaced relation to the first mentioned means and cooperating therewith automatically to move said edge-engaging means into engagement with the edges of said boat seat when said portable seat is placed on said boat seat, and out of engagement with said edges when said portable seat is lifted from said boat seat.

References Cited in the file of this patent

UNITED STATES PATENTS

| Number | Name | Date |
| --- | --- | --- |
| 322,201 | Reisener | July 14, 1885 |
| 1,126,911 | Stull | Feb. 2, 1915 |
| 1,434,777 | Handler | Nov. 7, 1922 |
| 1,846,607 | Nicholas | Feb. 23, 1932 |